(12) United States Patent
Rosier et al.

(10) Patent No.: US 7,277,439 B2
(45) Date of Patent: Oct. 2, 2007

(54) DUAL-MODE DATA TRANSMISSION SYSTEM AND PROCESS, CORRESPONDING TRANSMITTER AND RECEIVER

(75) Inventors: Corinne Rosier, Rennes (FR); Francis Pitcho, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 823 days.

(21) Appl. No.: 09/855,687

(22) Filed: May 16, 2001

(65) Prior Publication Data

US 2002/0015408 A1 Feb. 7, 2002

(30) Foreign Application Priority Data

May 31, 2000 (FR) .................................. 00 07056

(51) Int. Cl.
  *H04L 12/56* (2006.01)
(52) U.S. Cl. ...................................... 370/394
(58) Field of Classification Search ................ 370/229, 370/235, 236, 389, 394, 216; 714/701, 746, 714/748, 749, 750, 774
See application file for complete search history.

(56) References Cited

U.S. PATENT DOCUMENTS

| 5,828,677 | A  | * | 10/1998 | Sayeed et al. | ............... | 714/774 |
| 6,182,264 | B1 | * | 1/2001  | Ott           | ............... | 714/774 |
| 6,882,637 | B1 | * | 4/2005  | Le et al.     | ............... | 370/349 |

FOREIGN PATENT DOCUMENTS

| EP | 0 866 579 | 9/1998 |
| GB | 1 428 050 | 3/1976 |

OTHER PUBLICATIONS

Stallings, William. Data and Computer Communications. Prentice Hall. Copyright 1997. pp. 158-176.*
Zorzi et al. "ARQ Error Control for Fading Mobile Radio Channels". IEEE. May 1997. pp. 445-455.*
Casner et al. Compressing IP/UDP/RTP Headers for Low-Speed Serial Links. RFC 2508. IETF. Feb. 1999. pp. 1-24.*

* cited by examiner

*Primary Examiner*—Derrick W. Ferris
(74) *Attorney, Agent, or Firm*—Oblon, Spivak, McClelland, Maier & Neustadt, P.C.

(57) ABSTRACT

A process for transmitting data between at least one transmitter and one receiver, in the form of packets of at least one datum, each of said data packets being associated with an identifier of said packet. Such a process implements at least two transmission modes:
  an explicit mode, wherein each of the data packets, called explicit packets, is transmitted with the identifier of the data packet, and
  an implicit mode, wherein the data packets, called implicit packets, are transmitted without being accompanied by the identifiers.

Additionally such a process includes at least one first transfer stage from the explicit mode to the implicit mode and/or at least one second transfer stage from the implicit mode to the explicit mode, selection of the first or second transfer stages being determined as a function of one predetermined transfer criterion associated with the data packet.

21 Claims, 4 Drawing Sheets

DUAL-MODE DATA TRANSMISSION SYSTEM AND PROCESS, CORRESPONDING TRANSMITTER AND RECEIVER

DISCUSSION OF BACKGROUND

Field of the Invention

The field of the invention is that of data transmission from a transmitter to a receiver. More exactly, the invention concerns all communication systems requiring high transmission quality, and wherein the use of the bandwidth is to be optimised. The invention is particularly adapted to radio-communication systems, wherein the radio resource is a rare resource, and where the transmission channel is subject to interference.

BACKGROUND

The invention applies particularly, but not exclusively, to transmission protocols of the Automatic Repeat Request (ARQ) type which implement error control functions within communication systems.

Numerous error control techniques are generally used in communication systems to compensate for the loss and/or degradation of data transmitted from a source point to a destination point. Conventionally, error control implements a detection of transmission errors, and a retransmission of lost or damaged data. A protocol of the ARQ type makes it possible simultaneously to manage error control and data stream control, by regulating the stream of transmitted data, and by determining whether one or more data items are to be retransmitted.

Several ARQ type protocols are known, such as the Go-Back-N type protocols, Stop-and-Wait type protocols or Selective Repeat type protocols. In protocols of the Go-Back-N and Selective Repeat type, which are among the most commonly used ARQ type protocols, an identifier is inserted, generally called a sequence number, into each packet of data exchanged by ARQ type terminals. A data packet is understood here and throughout the remainder of the document, as a unit of one or more data items, such as, for example, a Protocol Data Unit (PDU) or a data field.

The ARQ transmitter keeps a list of the sequence numbers of the PDUs which it is authorised to transmit. On its side, the ARQ receiver keeps a list of the sequence numbers of the PDUs which it is prepared to receive. Knowledge of the sequence number of the PDUs thus allows the ARQ receiver to detect the loss or deterioration of some data packets, and to indicate these transmission errors to the ARQ transmitter, which then retransmits the PDU or PDUs which had not been correctly received.

One drawback of this technology of the prior art is that, when data transmission occurs without error, there is no need to transmit the data packet identifiers. Indeed, in protocols of the Go-Back-N and Selective Repeat type, for example, transmitting the sequence numbers associated with the PDUs uses up bandwidth to no purpose, particularly when the transmission channel is not subject to interference.

Another drawback of this prior art technology is that it is therefore expensive, in the situation where the data packet identifiers are transmitted needlessly.

Another drawback of this prior art technology is that, when there is no need to transmit the data packet identifiers, the space that they occupy within the packets could be used for other purposes, such as Forward Error Correction (FEC) for example.

SUMMARY OF THE INVENTION

The particular objective of the invention is to overcome these drawbacks of the prior art.

More exactly, an objective of the invention is to provide a process for transmitting data which is straightforward and inexpensive to implement.

Another objective of the invention is to implement a process for transmitting data making it possible, under certain conditions, to avoid transmitting a sent packet identifier.

A further objective of the invention is to provide a process for transmitting data making it possible to save bandwidth relative to other known transmission processes.

An objective of the invention is also to implement a process for transmitting data which can be applied in the framework of a protocol of the ARQ type.

Yet another objective of the invention is to provide a process for transmitting data making it possible to carry out forward error correction.

These objectives, and others which will emerge hereinafter are fulfilled according to the invention, by means of a process for transmitting data between at least one transmitter and at least one receiver, in the form of packets of at least one datum, each of said data packets being associated with an identifier of said packet.

Such a process implements at least two transmission modes:

an explicit mode, wherein each of said data packets, called explicit packets, is transmitted with said identifier of said data packet;

an implicit mode, wherein said data packets, called implicit packets, are transmitted without being accompanied by said identifiers.

Additionally, such a process includes at least one transfer stage from said explicit mode to said implicit mode and/or at least one transfer stage from said implicit mode to said explicit mode, as a function of at least one pre-determined transfer criterion.

Thus, the invention is based on a completely new and inventive approach to data transmission between a transmitter and a receiver. Indeed, it is based particularly on the existence of two distinct transmission modes, which are selectively implemented as a function of pre-determined criteria, linked for example to the quality of the channel established between the receiver and the transmitter, or to the extent of the interference which is superimposed on the transmitted data.

A system including at least one transmitter and at least one receiver, wherein such a process according to the invention is implemented, is therefore particularly adaptable to the environmental conditions of data transmission. In particular, such a dual-mode data transmission process is particularly cost effective in terms of bandwidth, the data packet identifiers being able to be transmitted or not transmitted, according to pre-determined criteria.

According to an advantageous characteristic of the invention, said receiver maintains at least one of the variables belonging to the group including:

variables relating to said identifiers of said data packets;
an error flag relating to said data transmission;
state variables relating to an implemented protocol.

Thus, the receiver may maintain a variable corresponding to the identifier (or sequence number) of the packets received. Such a variable may be used to detect data packets lost or damaged during transmission, in the case particularly where the receiver implements a protocol of the ARQ type.

The receiver may then also maintain state variables relating to the implemented ARQ protocol, such as an ARQ window variable for example.

To advantage, said error flag may take at least two states:

a "raised" state after said receiver receives an error message;

a "lowered" state after said receiver correctly receives an explicit packet.

Such an error message may, for example, come from the lower layers of the data transmission system to which the receiver belongs. Indeed, such lower layers are capable of detecting transmission errors, and therefore of determining when a data packet sent by a transmitter has not been received or has been wrongly received by the receiver, according to a technique which is not subject to the invention. It is of course also conceivable for an error message to be sent by the lower layers to the receiver for a reason other than a transmission error.

According to a first advantageous variant of the invention, said receiver being in explicit mode, said error flag being raised, said receiver rejects all the implicit packets received.

Indeed, when the receiver is in explicit mode and it has received an error message, it cannot assign an identifier to a received implicit data packet. It therefore rejects all received implicit packets. Furthermore, if the transmission process implements a protocol of the ARQ type, such rejected implicit packets are not used by the protocol.

According to a second advantageous variant of the invention, said receiver being in explicit mode and receiving at least one implicit packet, said error flag being raised, said receiver implements the following successive stages:

said receiver stores, according to a sequential order of storage, said at least one received implicit packet;

if said error flag remains in the "raised" state, said receiver processes said at least one stored implicit packet;

if said error flag passes to the "lowered" state, said receiver processes said at least one stored implicit packet and assigns to it the identifier which sequentially precedes said identifier of said received explicit packet, if it is the first stored implicit packet, or the identifier which sequentially precedes the identifier of the previously stored implicit packet according to said sequential order of storage.

Thus, when the receiver is in explicit mode and the error flag is raised, it stores the implicit packets it receives, according to a sequential order of storage, without determining their identifier. Such implicit packets are then called "sequencing pending". On receipt of an explicit packet with identifier N, the error flag then passes to the lowered state, and the receiver then processes the "sequencing pending" packets, by assigning to each one an identifier in the following way (in the interest of simplification, it is presupposed here that the identifier is a sequence number): the last implicit packet received and stored by the receiver is assigned the number N−1, the last but one implicit packet received receives the identifier N−2 and so on until all the implicit packets stored by the receiver have been processed.

In the particular case where the identifier is to be between a pre-determined minimum value SN_Min and a pre-determined maximum value SN_Max, the identifiers are assigned to the implicit packets stored modulo SN_Max+1.

If the process implements a protocol of the ARQ type, the stored implicit packets are then used by the protocol, after receiving their identifier.

On the other hand, if the receiver has stored implicit packets and receives a new error message (the error flag remains then in the raised state), it rejects all the stored implicit packets, without processing them.

If the receiver receives neither a new error message, nor an explicit packet, it is also conceivable for it to reject the stored implicit packets after a predetermined time, or, for example, when a maximum storage capacity of implicit packets is reached.

Such a variant allows the receiver not to reject the implicit packets received after receipt of an error message, but to store them until receipt of the next error message, or of the next explicit packet. It is therefore conceivable, in order to implement such a variant, for the transmitter, being in implicit mode, to pass to explicit mode at pre-determined time intervals, so as to send one or more explicit packets to the receiver, in such a way to allow the receiver to process the implicit packets stored.

The first data packet sent by the transmitter after transfer from implicit mode to explicit mode must then be the data packet whose identifier directly follows the identifier of the last data packet sent in implicit mode, in such a way that the identifiers assigned to the implicit packets stored by the receiver are correct. The transmitter, after sending one or more explicit packets, then goes back to implicit mode.

Advantageously, the transfer of said receiver from said explicit mode to said implicit mode is triggered by the receipt of an implicit packet, provided that said error flag is in the "lowered" state and said transfer from said implicit mode to said explicit mode is triggered by the receipt of an explicit packet and/or an error message.

Thus, provided that the receiver has not received an error message, in other words provided that the error flag is not raised, the receipt of an implicit data packet triggers the transfer of the receiver from explicit mode to implicit mode.

Likewise, receipt of an explicit data packet forces the receiver to transfer from implicit mode to explicit mode. Transfer from implicit mode to explicit mode, on the receiver side, may also be triggered by receipt of an error message, coming, for example, from the lower layers, on detection of a transmission error.

According to an advantageous technique of the invention, said receiver having correctly received a data packet, it sends to said transmitter at least one conventional acknowledgement message of said received packet, containing said identifier of said next data packet expected by said receiver, and, in at least some cases, said receiver, prior to said dispatch of said at least one conventional acknowledgement message, sends to said transmitter at least one advance acknowledgement message.

A conventional acknowledgement message contains a field whose value makes it possible to determine the identifier of the next data packet expected by the receiver. Thus, in the case where the identifier is a sequence number for example, receipt by the transmitter of an acknowledgement message bearing the value N indicates that all the data packets with a sequence number lower than N have been correctly received by the receiver, and that the data packet with identifier N has not been received by the receiver, or has been damaged during transmission.

According to the protocol implemented, the receiver may send an acknowledgement message on receipt of a data packet, or send acknowledgement messages at pre-determined time intervals for example. Sending an acknowledgement message may also be delayed until the receiver has received a pre-determined number of data packets, or may be delayed by the lower layers of the data transmission system, for example if there are no resources available to transmit it.

It is also conceivable for the receiver to send several consecutive acknowledgement messages to the transmitter, in the event of transmission error for example. Thus, even in the event of loss or deterioration of the acknowledgement messages, the probability is increased of indicating to the transmitter that one or more data packets have been lost or damaged. With the transmitter being informed more rapidly of any possible transmission error, the period during which the transmitter and the receiver are desynchronised is thus reduced, and an errorless operating mode can be more quickly recovered.

To advantage, said transmitter maintains at least one of the variables belonging to the group including:

variables relating to identifiers of at least some of said transmitted packets;

for each of said transmitted packets, a clock being able to take at least three states:

an "in progress" state, after sending of said transmitted packet;

a "stopped" state, after receipt of an acknowledgement message of said transmitted packet;

an "expired" state, after a pre-determined maximum time;

state variables relating to an implemented protocol.

With each packet that it receives from the upper layers of the data transmission system, the transmitter associates an identifier, which can be a sequence number for example. This sequence number is between a minimum value SN_Min, which can for example be equal to zero, and a maximum value SN_Max. The transmitter therefore maintains the variables corresponding to the identifier of the packet received from the upper layers, SN_Min and SN_Max. Additionally, the transmitter may maintain variables relating to the implemented protocol, such as ARQ window variables for example.

The transmitter may also maintain a clock variable, for each of the data packets which it transmits to the receiver. When a data packet is sent to the receiver (for example a packet whose sequence number is N), the corresponding clock passes to the "in progress" state. In the event of receipt of an acknowledgement message, indicating directly or indirectly, that the packet with which the clock is associated has been correctly received by the receiver, the clock passes to the "stopped" state.

Such an acknowledgement message may be a message indicating that the next packet expected by the receiver is the packet with identifier N+1, or a message indicating that the next packet expected by the receiver is a packet with identifier N+M, with M>1, which assures the transmitter that all the packets with identifier lower than N+M have been correctly received. In the event of non receipt of an acknowledgement message, the clock passes to the "expired" state after a pre-determined maximum time.

For example, such a pre-determined maximum time, called Round Trip Time (RTT) is constituted by the sum of the following times:

the time required by the transmitter to send a data packet;

the time required by the receiver to receive and process the sent data packet;

the time required by the receiver to send a response to the transmitter (for example an acknowledgement message), pre-supposing that the receiver sends this response as soon as possible;

the time required by the transmitter to process the response from the receiver.

Advantageously, the transfer of said transmitter from said explicit mode to said implicit mode is triggered by an event internal and/or external to said transmitter, if at least one explicit packet has been sent by said transmitter since the last transfer of said transmitter from said implicit mode to said explicit mode.

When it passes into implicit mode, the transmitter sends implicit packets in the order of their identifiers and without duplication, starting with the implicit packet whose identifier follows the identifier of the last packet sent in explicit mode.

According to an advantageous characteristic of the invention, said transmitter maintains additionally at least one of the variables belonging to the group including:

a first identification variable, called EoW, whose value is an identifier of said next packet to be transmitted;

a second identification variable, called BoW, whose value is the smallest of said identifiers of said transmitted packets, for which said transmitter has not received an acknowledgement message, said identifier being a number, assigned sequentially to each of said data packets.

To advantage, said identifier is a number, assigned sequentially to each of said data packets, and said event is constituted by the combination of the following conditions:

said transmitter receives an acknowledgement message containing the identifier N of the next data packet expected by said receiver;

said clock of each of said packets with SN identifiers transmitted by said transmitter is either in said "in progress" state, or in said "stopped" state, SN being greater than or equal to N, and SN being strictly lower than the identifier of said next packet to be transmitted (EoW).

Indeed, receipt of an acknowledgement message containing the identifier N indicates to the transmitter that all the packets with identifier lower than or equal to N−1 have been correctly received by the receiver. If, furthermore, for all the packets transmitted by the transmitter subsequently to the packet with identifier N−1, the clocks are in the "stopped" state (the transmitter has then received an acknowledgement message indicating that the corresponding packet has been correctly received) or in the "in progress" state (the transmitter is awaiting an acknowledgement message for this packet), the transmitter is assured that there has been no transmission error for all the data packets sent more than one Round Trip Time before receipt of the acknowledgement message containing the identifier N.

The transmitter may then pass into implicit mode, since the connection between the transmitter and the receiver seems to be of good quality.

According to a first advantageous embodiment of the invention, said identifier is a number, assigned sequentially to each of said data packets, and the transfer of said transmitter from said implicit mode to said explicit mode is triggered by receipt of an acknowledgement message containing the identifier N of said next data packet expected by said receiver, if the two following conditions are met:

said transmitter has transmitted at least one packet with identifier SN, with SN greater than or equal to N, and SN strictly lower than the identifier of said next packet to be transmitted;

said clock of one at least of said packets with identifier SN is in the "expired" state.

Such circumstances indicate to the transmitter a probable transmission error of the packet with identifier N. Indeed, with the clock of the packet with identifier SN being in the "expired" state, it is known that the time which has elapsed since the transmission of such a packet is greater than the pre-determined maximum time RTT. In the absence of any transmission error, the receiver would therefore have already sent to the transmitter an acknowledgement message containing the identifier SN+1, and indicating that all the packets with identifier lower than or equal to SN have been correctly received.

Being aware of such a transmission error, the transmitter then goes into explicit mode.

In explicit mode, the transmitter may send any packet with identifier N, authorised by the protocol implemented in the data transmission system according to the invention. Particularly, the transmitter may send data packets without respecting the order of their identifiers and/or duplicating some data packets.

According to a second advantageous embodiment of the invention, said identifier is a number, assigned sequentially to each of said data packets, and the transfer of said transmitter from said implicit mode to said explicit mode is triggered by the transfer of said clock of a packet with identifier SN into said "expired" state, SN being greater than or equal to said second identification variable BoW, and strictly lower than said first identification variable EoW.

Thus, according to this second embodiment of the invention, the transition from implicit mode to explicit mode is triggered by the expiry of a clock, even if no acknowledgement message has yet been received by the transmitter. Such an embodiment makes it possible, on the one hand, to obtain a greater data transmission system reactivity to the appearance of errors, and on the other hand, to avoid implicit packets being needlessly rejected by the receiver.

Indeed, on receipt of an error message, the receiver is transferred into explicit mode, and finds itself therefore desynchronised from the transmitter, which is still in implicit mode and continues to send implicit packets to the receiver. Such an embodiment makes it possible to reduce the time interval during which the receiver and the transmitter do not operate according to the same mode, so as to optimise the operation of the data transmission system.

According to an advantageous technique, said explicit mode implements a protocol of the ARQ (Automatic Repeat Request) type.

Advantageously, said ARQ type protocol belongs to the group including:
   protocols of the Go-back-N type;
   protocols of the Selective Repeat type;
   protocols of the Stop-and-Wait type.

The invention also applies of course to other types of protocols.

The invention also concerns a system for transmitting data exchanged between at least one transmitter and at least one receiver, in the form of packets of at least one datum, each of said data packets being associated with an identifier of said packet.

According to the invention, such a system includes at least two transmission modes:
   an explicit mode, wherein each of said data packets, called explicit packets, is transmitted with said identifier of said data packet;
   an implicit mode, wherein said data packets, called implicit packets, are transmitted without being accompanied by said identifiers.

Additionally, such a system implements transfer means from said explicit mode to said implicit mode and/or transfer means from said implicit mode to said explicit mode, according to at least one pre-determined transfer criterion.

The invention further concerns a transmitter of a data transmission system, of the type making it possible to exchange data with at least one receiver, in the form of packets of at least one datum, each of said data packets being associated with an identifier of said packet.

According to the invention, such a transmitter operates according to at least two transmission modes:
   an explicit mode, wherein each of said data packets, called explicit packets, is transmitted with said identifier of said data packet;
   an implicit mode, wherein said data packets, called implicit packets, are transmitted without being accompanied by said identifiers.

Additionally, such a transmitter includes transfer means from said explicit mode to said implicit mode and/or transfer means from said implicit mode to said explicit mode, according to at least one pre-determined transfer criterion.

The invention further concerns a receiver of a data transmission system, of the type making it possible to exchange data with at least one transmitter, in the form of packets of at least one datum, each of said data packets being associated with an identifier of said packet.

According to the invention, such a receiver operates according to at least two data reception modes:
   an explicit mode, wherein each of said data packets, called explicit packets, is transmitted with said identifier of said data packet;
   an implicit mode, wherein said data packets, called implicit packets, are transmitted without being accompanied by said identifiers.

Additionally, such a receiver includes transfer means from said explicit mode to said implicit mode and/or transfer means from said implicit mode to said explicit mode, according to at least one pre-determined transfer criterion.

BRIEF DESCRIPTION OF THE DRAWINGS

Other characteristics and advantages of the invention will emerge more clearly from reading the following description of a preferential embodiment, given as a straightforward illustrative and non restrictive example, and the appended drawings, among which.

DESCRIPTION OF THE EMBODIMENTS

In the interest of simplification, it is pre-supposed in all the FIGS. 1 to 7 that a data packet identifier is a sequence number. The invention also applies of course to other types of identifier, such as a character string for example.

The general principle of the invention is based on the existence of two data transmission modes, an explicit mode wherein the data packets are transmitted with their identifier, and an implicit mode wherein the packets are transmitted without identifier. Optimal system operation is achieved when the transmitter and the receiver are approximately synchronised, in other words when the length of the periods during which the transmitter and the receiver do not operate according to the same transmission mode is appreciably reduced.

Figure 1:
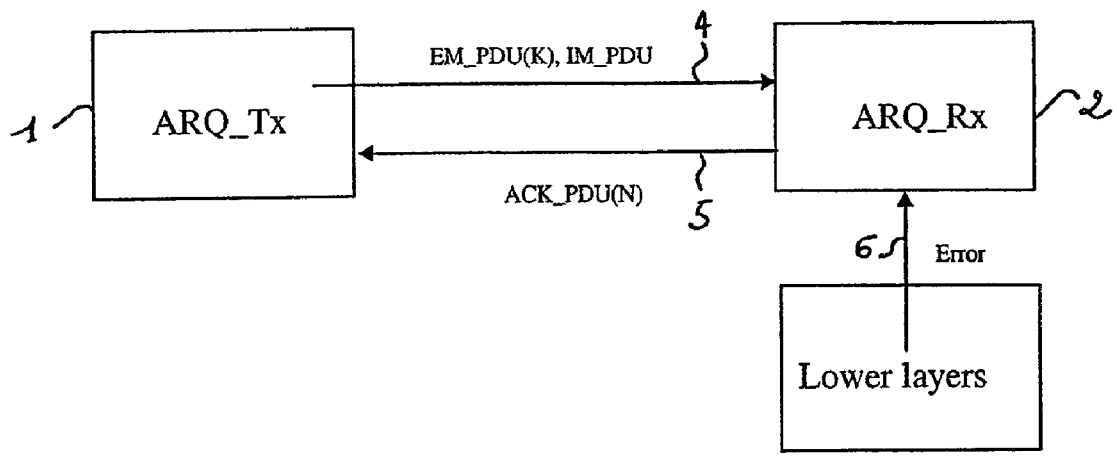
FIG. 1 shows a block diagram of the data transmission system according to the invention.

An embodiment is shown in relation to FIG. 1 of a data transmission system according to the invention.

Such a data transmission system includes a transmitter 1 and a receiver 2. The transmitter 1 sends data packets to the receiver 2 by the connection 4: these data packets may be explicit packets EM_PDU (K), containing the identifier K of the transmitted packet, or implicit data packets IM_PDU. The receiver 2 transmits to the transmitter 1 acknowledgement messages ACK_PDU (N) containing the identifier N of the next data packet expected by the receiver 2.

The receiver 2 may send such acknowledgement messages after receiving and processing a data packet sent by the transmitter 1, or at any other moment, particularly at a moment determined by the data transmission protocol implemented in the system in FIG. 1.

The lower layers 3 of the system send error messages to the receiver 2 by means of a connection 6. Such error messages make it possible particularly to inform the receiver 2 that a transmission error has occurred during the exchange of information between the transmitter 1 and the receiver 2. The technique implemented by the lower layers 3 for detecting such transmission errors is not subject to the present application.

In the interest of simplification, in the next figures the same numbers are assigned to identical elements.

Figure 2:
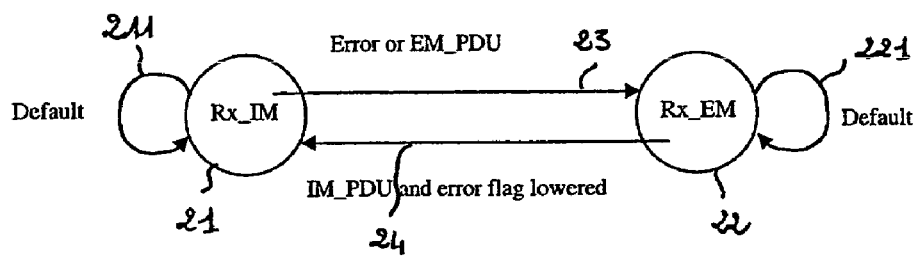
FIG. 2 shows a state machine of the data transmission system receiver shown in FIG. 1.

Next is shown, in relation to FIG. 2, a state machine of the receiver 2, showing the conditions of transition from implicit mode 21 (and explicit 22 respectively) to explicit mode 22 (and implicit 21 respectively).

The receiver 2 may operate in implicit mode 21 or in explicit mode 22. The transition 23 from implicit mode 21 to explicit mode 22 may be triggered by receipt of an error message coming from the lower layers 3, not shown in FIG. 2, or by receipt of an explicit data packet EM_PDU coming from the transmitter 1. If the receiver 2 receives neither explicit packet nor error message, it remains in implicit operation mode, as shown by the arrow denoted 211.

The transition 24 from explicit mode 22 to implicit mode 21 may be triggered by receipt of an implicit data packet IM_PDU, provided that the error flag is in the lowered state.

If the receiver 2 does not receive an implicit packet, or if the error flag is raised on receipt of an explicit packet, the receiver 2 remains in explicit operation mode, as shown by the arrow denoted 221.

Figure 3:
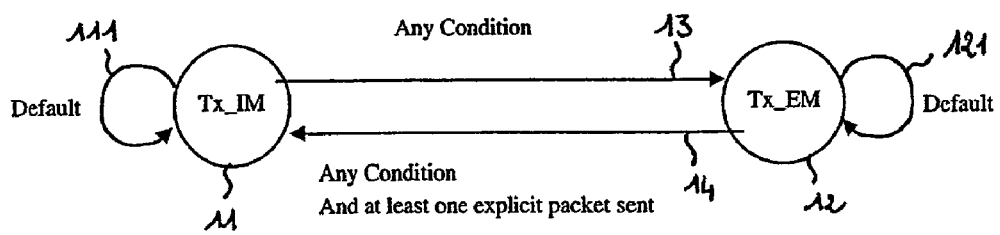
FIG. 3 shows a first state machine of the data transmission system transmitter shown in FIG. 1.

FIG. 3 shows a first state machine of the transmitter 1, having the conditions of transition from implicit mode 11 (and explicit 12 respectively) to explicit mode 12 (and implicit 11 respectively).

The transfer 13 from implicit mode 11 to explicit mode 12 of the transmitter 1 may be triggered by any event internal and/or external to the transmitter 1. By default, the transmitter 1 remains in the implicit state 11, as shown by the arrow denoted 111.

Likewise, transfer 14 from explicit mode 12 to implicit mode 11 may be triggered by an event internal and/or external to the transmitter 1, provided that at least one explicit packet has been sent by the transmitter 1 since the last transition 13 from implicit mode to explicit mode. Such an event internal and/or external to the transmitter may be, for example, determined by the data transmission protocol implemented in such a data transmission system according to the invention. By default, the transmitter 1 remains in explicit operation mode 12, as shown by the arrow denoted 121.

Figure 4:
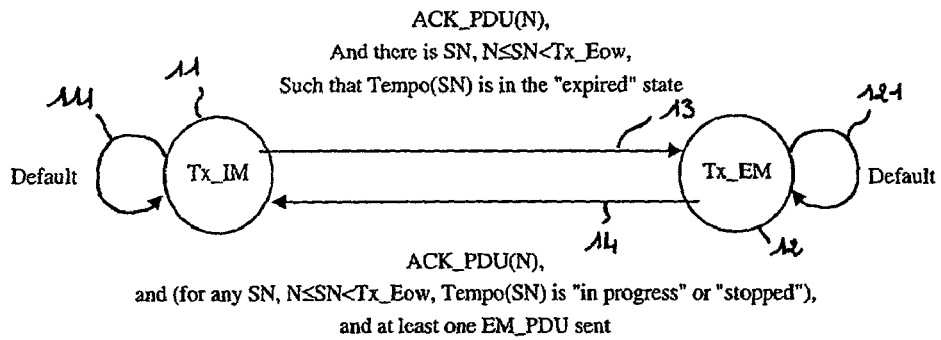
FIG. 4 shows a second state machine of the data transmission system transmitter shown in FIG. 1.

Next is shown, in relation to FIG. 4, a second state machine of the transmitter 1, showing more detailed transition conditions from implicit mode 11 (and explicit 12 respectively) to an explicit mode 12 (and implicit 11 respectively). Such a state machine may particularly be obtained, according to the invention, when the data transmission system, shown in FIG. 1, implements a protocol of the ARQ type.

The transition 13 from implicit mode 11 to explicit mode 12 is, in this particular embodiment, triggered by the receipt of an acknowledgement message containing the identifier N, ACK_PDU (N), provided that the transmitter 1 has sent at least one packet with identifier SN, such that N≦SN<Tx_Eow, the clock of which is in the "expired" state. (It will be remembered that Tx_Eow is the identifier of the next data packet to be transmitted) Indeed, such a condition indicates to the transmitter 1 a transmission error, since, in normal operation, with the clock of the packet with identifier SN being "expired", the transmitter 1 should have already received an acknowledgement message from the receiver 2, indicating that this packet has been correctly received.

The transition 14 from explicit mode 12 to implicit mode 11 is, in the embodiment shown in FIG. 4, triggered by the receipt of an acknowledgement message containing the identifier N, ACK_PDU (N), provided that the transmitter has sent at least one explicit packet EM_PDU since the last transition 13 from implicit mode 11 to explicit mode 12, on the one hand, and provided that the clock of each of the data packets with identifier SN sent by the transmitter 1, with N≦SN<Tx_Eow, is in the "in progress" state or in the "stopped" state, on the other hand. Indeed, such conditions indicate to the transmitter 1 that all the data packets sent more than one RTT before the receipt of the acknowledgement message ACK_PDU (N) have been correctly received. The transmitter 1 may therefore pass into implicit mode 11, since the connection between the transmitter 1 and the receiver 2 does not seem to be subject to interference.

Figure 6:
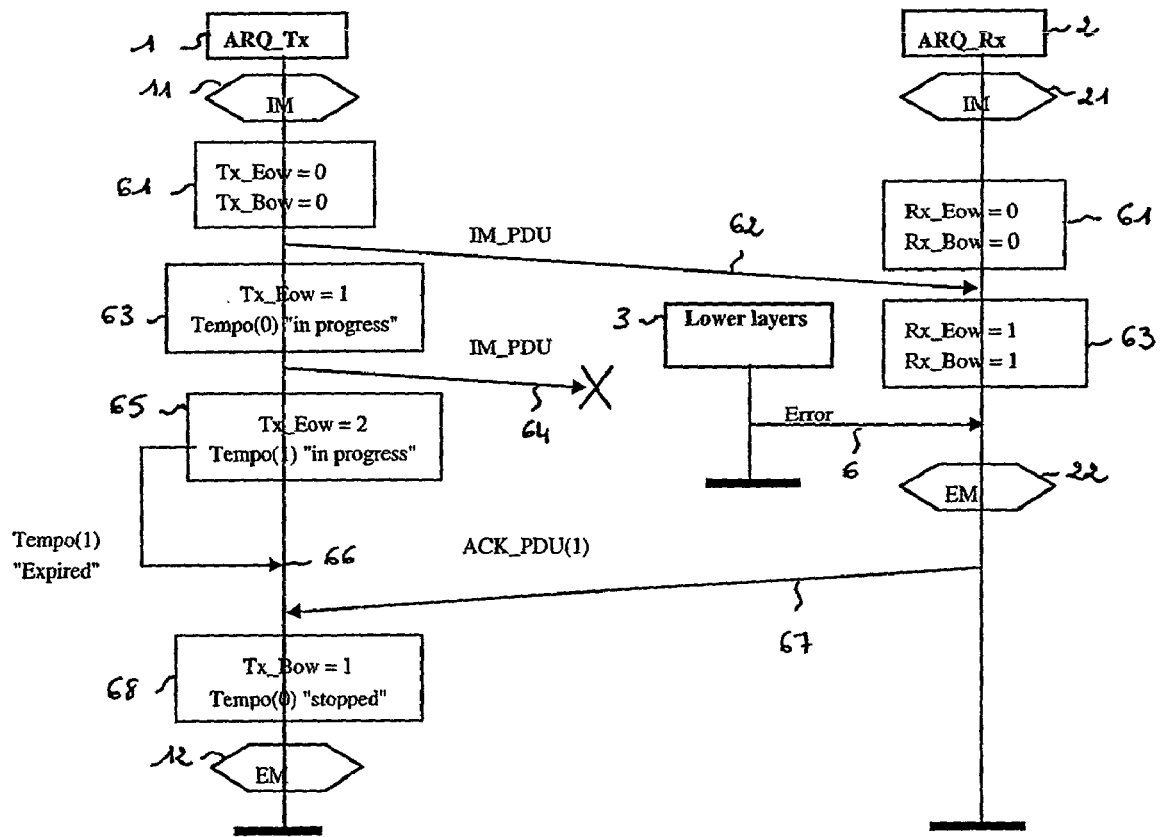
FIG. 6 shows an embodiment example of a transition from implicit mode to explicit mode.
Figure 5A:
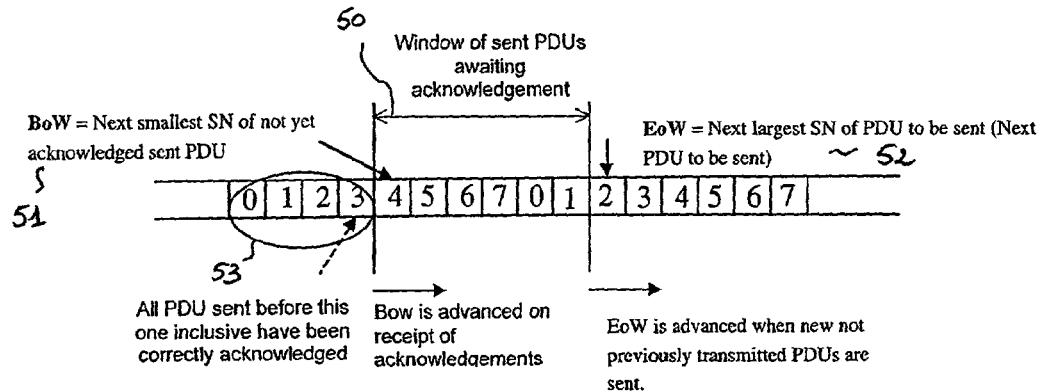
FIGS. 5a to 5c describe the variables maintained by the transmitter and the receiver of the system in FIG. 1 when they implement a protocol of the ARQ type.
Figure 5B:
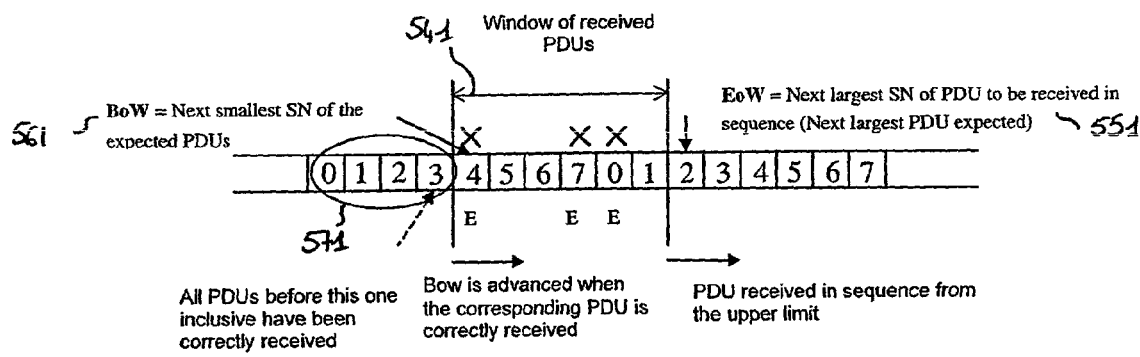
Figure 5C:
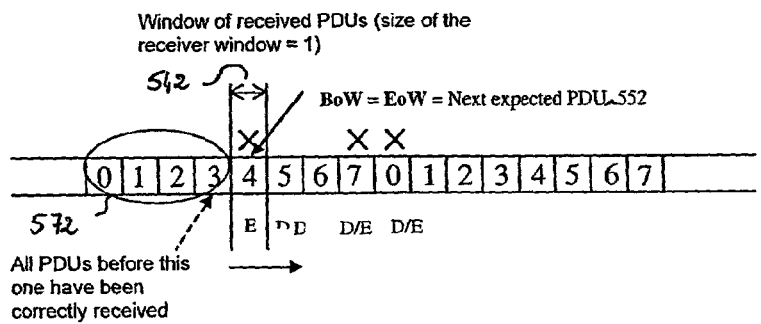
Figure 7:
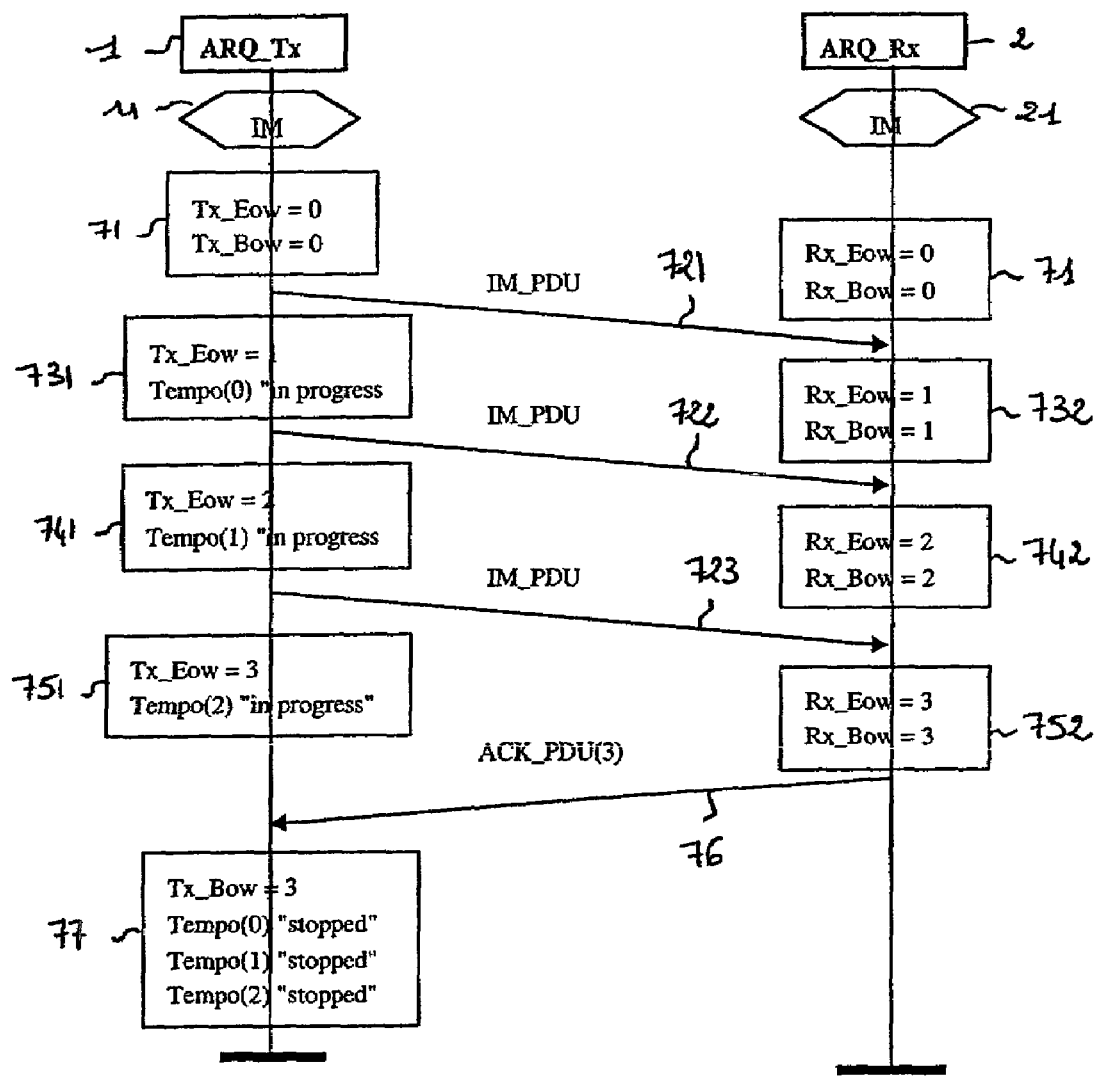
FIG. 7 shows an operation example of the system in FIG. 1 in implicit mode.

Next is shown, in relation to FIGS. 5a to 5c, definitions of variables used in FIGS. 6 and 7, and maintained by the transmitter 1 and the receiver 2 when they implement a protocol of the ARQ type. It will be noted that these definitions may differ from the definitions used in other types of ARQ protocols.

FIG. 5a shows the definition of the notions of Window 50, Bottom of Window 51 (BoW) and End of Window (EoW) for the transmitter 1.

In the example shown in FIG. 5a, the data packets of the group 53 have been sent by the transmitter 1, and acknowledged by the receiver 2, in other words the transmitter 1 has received at least one acknowledgement message, indicating that the data packets with identifier lower than or equal to 3 have been correctly received.

The data packets of the window 50 (i.e. the data packets with identifier no. 4, 5, 6, 7, 0 and 1) have been sent by the transmitter 1 to the receiver 2, but are awaiting acknowledgement, in other words the transmitter 1 has not yet received any acknowledgement message, indicating to it that these data packets had been correctly or wrongly received.

The first data packet of the window 50, which bears the identifier no. 4 is defined as the bottom of window 51, known as BoW, which corresponds to the smallest packet identifier sent, but not yet acknowledged. The BoW variable is advanced on receipt of an acknowledgement message containing the identifier no. 4 coming from the receiver 2.

The identifier of the first data packet following the last data packet from the window 50 is defined as the end of window 52, known as EoW. In the example in FIG. 5a, EoW corresponds to the identifier of packet no. 2. EoW is the identifier of the next packet which the transmitter 1 is to transmit, and it is advanced when new not previously transmitted data packets are sent.

FIG. 5b shows the notions of window, bottom of window (BoW) and end of window (EoW) for the receiver 2, when it implements an ARQ protocol of the Selective Repeat type.

The receiver 2 maintains a window 541 of six data packets corresponding to the data packets received. In the example in FIG. 5b, the packets with identifier nos. 5, 6 and 1 of the window 541 have been correctly received, and an error has occurred during transmission of packets with identifier nos. 4, 7 and 0 of the window 541. All the data packets of the group 571 have been correctly received by the receiver 2.

The bottom of window, BoW, 561 variable is defined as the smallest identifier (modulo 8 in the example in FIG. 5c) of the data packets expected by the receiver 2. BoW is the identifier of the first data packet of the window 541, i.e. the identifier of packet no. 4 in the example in FIG. 5b. On receipt of the packet with identifier no. 4, BoW will be advanced, and will take the value 7, the next data packet expected by the receiver 2 being then the packet with identifier no. 7.

The end of window EoW 551 variable is defined as the identifier of the next data packet expected in sequence by the receiver 2. This is the identifier of the data packet which follows the last packet of the window 541, i.e. the identifier of packet no. 2 in the example in FIG. 5b.

FIG. 5c shows the notions of window, bottom of window (BoW) and end of window (EoW) for the receiver 2, when it implements an ARQ protocol of the Go-Back-N type.

In this example, the receiver 2 maintains a window 542 which contains a single data packet, namely the packet with identifier no. 4, for which a transmission error has occurred. Subsequently, the receiver 2 has received the packets with identifier nos. 5 and 6, which it has rejected, and the packets with identifier nos. 7 and 0, for which a transmission error has occurred. All the data packets of the group denoted 572 have, furthermore, been correctly received by the receiver 2.

The bottom of window BoW and end of window EoW variables 552 are defined as the identifier of the next data packet expected by the receiver 2. In the example in FIG. 5c, BoW=EoW=4, since the next data packet expected by the receiver 2 is the packet with identifier no. 4, for which a transmission error has occurred.

FIG. 6 shows, in operation, an example of transfer from an implicit mode to an explicit mode of the system in FIG. 1, implementing a protocol of the ARQ type.

The transmitter 1 and the receiver 2 are in implicit mode 11, 21. At a moment denoted 61, for the transmitter 1, EoW=BoW=0, and, for the receiver 2, EoW=BoW=0. The next packet transmitted by the transmitter 1 will therefore be the packet with sequence number 0, and the next packet expected by the receiver 2 is also the packet with identifier no. 0.

During a stage denoted 62, the transmitter 1 sends an implicit data packet to the receiver 2, which receives it correctly.

At the moment denoted 63, for the transmitter 1, the EoW variable takes the value 1, indicating that the next data packet sent by the transmitter 1 will be the packet with sequence no. 1. The clock of packet 0 is in the "in progress" state. For the receiver 2, the EoW and BoW variables take the value 1, indicating that the next data packet expected by the receiver 2 is the packet with identifier no. 1.

During a stage denoted 64, the transmitter 1 sends the implicit data packet no. 1 to the receiver 2. The lower layers 3 send by the connection 6 an error message to the receiver 2, to indicate to it that a transmission error has occurred. The receiver 2, on receipt of the error message, then passes into explicit mode 22.

At the moment denoted 65, which follows the transmission of the packet with identifier no. 1, the EoW variable of the transmitter 1 takes the value 2, indicating that the next data packet sent by the transmitter 1 will be the packet with identifier no. 2. The clock of the packet with identifier no. 1 is in the "in progress" state. After a pre-determined maximum time (equal to RTT for example), the clock of the packet with identifier no. 1 goes into the "expired" state at the moment denoted 66.

After passing into explicit mode 22, the receiver 2 sends, during a stage denoted 67, an acknowledgement message containing the identifier no. 1, ACK_PDU(1), so as to indicate to the transmitter 1 that the next data packet expected by the receiver 2 is the packet with identifier no. 1, thus indicating that an error has occurred during transmission of this packet.

The transmitter 1 receives this acknowledgement message after the expiry of the clock of the packet with identifier no. 1. At the moment denoted 68, the BoW variable of the transmitter 1 is such that BoW=1, since the transmitter 1 is still awaiting acknowledgement of the packet with identifier no. 1. The clock of the packet with identifier no. 0 passes into the "stopped" state on receipt of the acknowledgement message ACK_PDU(1).

Such conditions indicate to the transmitter 1 that a transmission error has occurred, and it therefore passes into explicit mode 12.

Next is shown in relation to FIG. 7 an operation example of the transmission system in FIG. 1 in implicit mode, when it implements a protocol of the ARQ type.

The transmitter 1 and the receiver 2 are in implicit mode 11, 21. On the transmitter 1 side, at the moment denoted 71, EoW=BoW=0, indicating that the next data packet sent by the transmitter 1 will be the packet no. 0. On the receiver 2 side, EoW=BoW=0, indicating that the receiver 2 is expecting the packet with identifier no. 0. The transmitter 1 and the receiver 2 are therefore in phase, and the implicit mode is adapted to the transmission of data.

During a stage denoted 721, the transmitter 1 transmits to the receiver 2 the implicit packet with identifier no. 0. At the moment denoted 731, it then advances the EoW variable to 1, thus indicating that the next data packet sent will be the packet with identifier no. 1, and it transfers the clock of the packet with identifier no. 0, Tempo(0), into the "in progress" state.

When it correctly receives the implicit packet with identifier no. 0, at the moment denoted 732, the receiver 2 updates the variables EoW=BoW=1, indicating that the next packet expected is the packet with identifier no. 1.

During a stage denoted 722, the transmitter 1 transmits to the receiver 2 the implicit packet with identifier no. 1. At the moment denoted 741, it then advances the EoW variable to 2, thus indicating that the next data packet sent will be the packet with identifier no. 2, and transfers the clock of the packet with identifier no. 1, Tempo(1), into the "in progress" state.

When it correctly receives the implicit packet with identifier no. 1, at the moment denoted 742, the receiver 2 updates the variables EoW=BoW=2, indicating that the next packet expected is the packet with identifier no. 2.

Again, during a stage denoted 723, the transmitter 1 sends the implicit packet no. 2. At the moment denoted 751, EoW takes the value 3, indicating that the transmitter is preparing to send the packet with identifier no. 3, and the clock Tempo(2) goes into the "in progress" state.

On receipt of the implicit packet with identifier no. 3, at the moment denoted 752, the receiver increases EoW and BoW to 3, indicating that it is expecting the packet with identifier no. 3. It then sends, during a stage denoted 76, an acknowledgement message ACK_PDU(3), so as to indicate to the transmitter 1 that all the packets with identifier lower than or equal to 2 have been correctly received.

On receipt of this acknowledgement message, at the moment denoted 77, the transmitter 1 updates the BoW variable, which takes the value 3, since the next data packet awaiting acknowledgement is the packet with identifier no. 3. The clocks Tempo(0), Tempo(1), and Tempo(2) of the packets with identifier nos.0, 1 and 2 pass into the "stopped" state, since these packets have been correctly acknowledged by the receiver 2.

The invention described in this document may particularly be used in the context of the Data Link Control layer (DLC) of Hiperlan 2 networks (cf. ETSI TS 101 761-1, v 1.1.1.). Error messages are sent by the Medium Access Control (MAC) sub-layer to the error control sub-layer when the Frame Control Channel (FCCH) is not correctly decoded, or when an awaited user (Long Transport Channel—LCH) data packet is not correctly decoded.

The two combinations reserved for a future use of the "LCH PDU type" field of LCH data packets are used in this invention to differentiate explicit data packets from implicit data packets.

The invention claimed is:

1. A process for transmitting data between at least one transmitter and at least one receiver removed from the at least one transmitter, in the form of data packets of at least one datum, each of said data packets being associated with an identifier of said data packet, said data packet identifier comprising a sequence number in the transmission of said data,
wherein the process implements at least two transmission modes:
an explicit mode, wherein each of said data packets, called explicit packets, is transmitted with said identifier of said data packet;
an implicit mode, wherein said data packets, called implicit packets, are transmitted without being accompanied by said identifiers;
and the process includes at least one first transfer stage from said explicit mode to said implicit mode and/or at least one second transfer stage from said implicit mode to said explicit mode, selection of one of the first and second transfer stages determined as a function of at least one pre-determined transfer criterion associated with the data packet,
wherein said receiver maintains an error flag relating to said data transmission, and
said error flag includes at least two states:
a raised state after said receiver receives an error message; and
a lowered state after said receiver correctly receives an explicit packet.

2. A process according to claim 1, wherein when said receiver is in the explicit mode and said error flag is raised, said receiver rejects all implicit packets received.

3. A process according to claim 1, wherein when said receiver is in the explicit mode and receives at least one implicit packet and said error flag is raised, said receiver implements the following successive stages:
said receiver stores, according to a sequential order of storage, said at least one received implicit packet;
upon said error flag remaining in the raised state, said receiver rejects said at least one implicit packet; and
upon said error flag passing to the lowered state, said receiver processes said at least one implicit packet and assigns to the at least one implicit packet an identifier which sequentially precedes said identifier of said received explicit packet, upon the at least one implicit packet is the first stored implicit packet, or upon the identifier which sequentially precedes the identifier of the received explicit packet being an identifier for a previously stored implicit packet according to said sequential order of storage.

4. A process according to any one of claims 2 to 3, wherein the transfer of said receiver from said explicit mode to said implicit mode is triggered by receipt of an implicit packet, provided that said error flag is in the lowered state, and said transfer from said implicit mode to said explicit mode is triggered by the receipt of an explicit packet and/or an error message.

5. A process according to any one of claims 1, 2, or 3, wherein said receiver having correctly received a data packet, said receiver sends to said transmitter at least one conventional acknowledgement message of said received packet, containing said identifier of said next data packet expected by said receiver,
and in at least some cases, said receiver, prior to said dispatch of said at least one conventional acknowledgement message, sends to said transmitter at least one advance acknowledgement message.

6. A process according to any one of claims 1, 2, or 3, wherein said transmitter maintains at least one of the following including:
variables relating to identifiers of at least some of said transmitted packets;
for each of said transmitted packets, a clock being able to take at least three states:
an in-progress state, after sending of said transmitted packet;
a stopped state, after receipt of an acknowledgement message of said transmitted packet;
an expired state, after a pre-determined maximum time; and
state variables relating to an implemented protocol.

7. A process according to any one of claims 1, 2, or 3, wherein the transfer of said transmitter from said explicit mode to said implicit mode is triggered by an event internal and/or external to said transmitter, if at least one explicit packet has been sent by said transmitter since the last transfer of said transmitter from said implicit mode to said explicit mode.

8. A process according to any one of claims 1, 2, or 3, wherein said transmitter maintains additionally at least one of the variables belonging to the group including:
a first identification variable EoW, whose value is an identifier of said next packet to be transmitted; and
a second identification variable BoW, whose value is the smallest of said identifiers of said transmitted packets, for which said transmitter has not received an acknowledgement message, said identifier being a number, assigned sequentially to each of said data packets.

9. A process according to claim 6, wherein said identifier is a number, assigned sequentially to each of said data packets, and said event is constituted by a combination of the following conditions:
said transmitter receives an acknowledgement message containing an identifier N of the next data packet expected by said receiver; and
said clock of each of said packets with identifiers SN transmitted by said transmitter is either in said in-progress state, or in said stopped state, SN being greater than or equal to N, and SN being strictly lower than an identifier of said next packet to be transmitted (EoW).

10. A process according to claim 6, wherein said identifier is a number, assigned sequentially to each of said data packets,
and the transfer of said transmitter from said implicit mode to said explicit mode is triggered by receipt of an acknowledgement message containing the identifier N of said next data packet expected by said receiver, if the two following conditions are confirmed:
said transmitter has transmitted at least one packet with identifier SN, with SN greater than or equal to N, and SN being strictly lower than the identifier of said next packet to be transmitted; and
said clock of one at least of said packets with identifier SN is in the expired state.

11. A process according to claim 6, wherein said identifier is a number, assigned sequentially to each of said data packets,
and the transfer of said transmitter from said implicit mode to said explicit mode is triggered by the transfer of said clock of a packet with identifier SN into said expired state, SN being greater than or equal to said second identification variable BoW, and strictly lower than said first identification variable EoW.

12. A process according to any one of claims 1, 2, or 3, wherein said explicit mode implements a protocol of the Automatic Repeat Request (ARQ) type.

13. A process according to claim 12, wherein said ARQ type protocol belongs to the group including:
protocols of the Go-back-N type;
protocols of the Selective Repeat type; and
protocols of the Stop-and-Wait type.

14. A system for transmitting data exchanged between at least one transmitter and at least one receiver removed from the at least one transmitter, in the form of packets of at least one datum, each of said data packets being associated with an identifier of said packet, said data packet identifier comprising a sequence number in the transmission of said data,
wherein the system is configured to include at least two transmission modes:
an explicit mode, wherein each of said data packets, called explicit packets, is transmitted with said identifier of said data packet;
an implicit mode, wherein said data packets, called implicit packets, are transmitted without being accompanied by said identifiers;
and the system implements a first transfer mechanism from said explicit mode to said implicit mode and/or a second transfer mechanism from said implicit mode to said explicit mode, selection of one of the first and second transfer mechanisms determined as a function of at least one pre-determined transfer criterion associated with the data packet,
wherein said at least one receiver is configured to maintain an error flag relating to said data exchanged, and
said error flag includes at least two states:
a raised state after said receiver receives an error message; and
a lowered state after said receiver correctly receives an explicit packet.

15. A transmitter of a data transmission system for exchanging data with at least one receiver removed from the at least one transmitter, in the form of packets of at least one datum, each of said data packets being associated with an identifier of said packet, said data packet identifier comprising a sequence number in the transmission of said data,
wherein the transmitter is configured to operate according to at least two data transmission modes:
an explicit mode, wherein each of said data packets, called explicit packets, is transmitted with said identifier of said data packet;
an implicit mode, wherein said data packets, called implicit packets, are transmitted without being accompanied by said identifiers;
and in that it includes a first transfer mechanism from said explicit mode to said implicit mode and/or a second transfer mechanism from said implicit mode to said explicit mode, selection of one of the first and second transfer mechanisms determined as a function of at least one pre-determined transfer criterion associated with the data packet,
wherein said at least one receiver is configured to maintain an error flag relating to exchanged data, and
said error flag includes at least two states:
a raised state after said receiver receives an error message; and
a lowered state after said receiver correctly receives an explicit packet.

16. A receiver of a data transmission system for exchanging data with at least one transmitter removed from the at least one transmitter, in the form of packets of at least one datum, each of said data packets being associated with an identifier of said packet, said data packet identifier comprising a sequence number in the transmission of said data,
wherein the receiver is configured to operate according to at least two data reception modes:
an explicit mode, wherein each of said data packets, called explicit packets, is transmitted with said identifier of said data packet;
an implicit mode, wherein said data packets, called implicit packets, are transmitted without being accompanied by said identifiers;
and the receiver is configured to include a first transfer mechanism from said explicit mode to said implicit mode and/or a second transfer mechanism from said implicit mode to said explicit mode, selection of one of the first and second transfer mechanisms determined as a function of at least one pre-determined transfer criterion associated with the data packet,
wherein said receiver is configured to maintain an error flag relating to said data transmission, and
said error flag includes at least two states:
a raised state after said receiver receives an error message; and
a lowered state after said receiver correctly receives an explicit packet.

17. A process according to claim 1, wherein said receiver maintains at least one of the following including:
variables relating to said identifiers of said data packets, and
state variables relating to an implemented protocol.

18. A system according to claim 14, wherein said at least one receiver is configured to maintain at least one of the following including:
  variables relating to said identifiers of said data packets, and
  state variables relating to an implemented protocol.

19. A transmitter according to claim 15, wherein said at least one receiver is configured to maintain at least one of the following including:
  variables relating to said identifiers of said data packets, and
  state variables relating to an implemented protocol.

20. A receiver according to claim 16, wherein said receiver is configured to maintain at least one of the following including:
  variables relating to said identifiers of said data packets, and
  state variables relating to an implemented protocol.

21. A method for transmitting data between at least one transmitter and at least one receiver removed from the at least one transmitter, comprising:
  transmitting data packets of at least one datum, each of said data packets being associated with an identifier of said data packet, said data packet identifier comprising a sequence number in the transmission of said data;
  implementing at least two transmission modes including an explicit mode, wherein explicit packets are transmitted with said identifier of said data packet, and an implicit mode, wherein implicit packets are transmitted without being accompanied by said identifiers;
  selecting one of first and second transfer stages determined as a function of at least one pre-determined transfer criterion associated with the data packets, said first transfer stage transferring from said explicit mode to said implicit mode and the second transfer stage transferring from said implicit mode to said explicit mode; and
  maintaining in said receiver an error flag relating to said data transmission, said error flag including a raised state after said receiver receives an error message and a lowered state after said receiver correctly receives an explicit packet.

* * * * *